(12) United States Patent
Weber (10) Patent No.: US 10,648,487 B2
(45) Date of Patent: May 12, 2020

(54) ACCUMULATOR DEVICE AND HYDROPNEUMATIC SUSPENSION

(71) Applicant: HYDAC TECHNOLOGY GMBH, Sulzbach/Saar (DE)

(72) Inventor: Norbert Weber, Saarbruecken (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 16/077,509

(22) PCT Filed: Feb. 3, 2017

(86) PCT No.: PCT/EP2017/000145
§ 371 (c)(1),
(2) Date: Aug. 13, 2018

(87) PCT Pub. No.: WO2017/157501
PCT Pub. Date: Sep. 21, 2017

(65) Prior Publication Data
US 2019/0048897 A1 Feb. 14, 2019

(30) Foreign Application Priority Data
Mar. 15, 2016 (DE) .......... 10 2016 003 153

(51) Int. Cl.
*F15B 1/24* (2006.01)
*B60G 17/04* (2006.01)
(Continued)

(52) U.S. Cl.
CPC ............ *F15B 1/24* (2013.01); *B60G 17/0416* (2013.01); *F15B 1/08* (2013.01); *F16F 9/06* (2013.01);
(Continued)

(58) Field of Classification Search
CPC .... F15B 1/02; F15B 21/12; F15B 1/24; F16F 9/06; F16F 9/32
(Continued)

(56) References Cited

U.S. PATENT DOCUMENTS

| 4,049,251 A | 9/1977 | Masae |
| 4,273,358 A * | 6/1981 | Taft .......... B60G 11/30 280/124.158 |

(Continued)

FOREIGN PATENT DOCUMENTS

| DE | 90 01 053 | 4/1990 |
| DE | 42 26 754 | 3/1993 |

(Continued)

OTHER PUBLICATIONS

International Search Report (ISR) dated Apr. 5, 2017 in International (PCT) Application No. PCT/EP2017/000145.

*Primary Examiner* — Patrick F Brinson
(74) *Attorney, Agent, or Firm* — Wenderoth, Lind & Ponack, L.L.P.

(57) ABSTRACT

An accumulator device (10) includes at least two accumulator elements (14, 16) that are combined to form a structural unit (12) and that have independently from one another their own accumulator characteristic curves (18, 20), in particular as a result of different preload pressures. The respective accumulator characteristic curves (18, 20) provide a combined total accumulator characteristic curve (22). A fluid can be stored in the structural unit (12) and can be retrieved from it. A hydropneumatic suspension system (24) has such an accumulator device (10).

8 Claims, 7 Drawing Sheets

(51) Int. Cl.
 *F15B 1/08* (2006.01)
 *F16F 9/06* (2006.01)
(52) U.S. Cl.
 CPC ........ *F16F 9/065* (2013.01); *B60G 2206/422* (2013.01); *F15B 2201/205* (2013.01); *F15B 2201/31* (2013.01); *F15B 2201/32* (2013.01); *F16F 2228/066* (2013.01)
(58) Field of Classification Search
 USPC .................................................. 138/31, 30
 See application file for complete search history.

(56) References Cited

U.S. PATENT DOCUMENTS

| | | | |
|---|---|---|---|
| 2004/0238054 A1* | 12/2004 | Weber ................. | F15B 1/24 138/31 |
| 2006/0054439 A1 | 3/2006 | Honma | |
| 2010/0206389 A1* | 8/2010 | Kennedy ............ | F15B 1/24 137/14 |
| 2012/0167704 A1* | 7/2012 | Lange ................. | F15B 1/24 74/473.11 |

FOREIGN PATENT DOCUMENTS

| | | |
|---|---|---|
| DE | 10 2007 031 525 | 9/2009 |
| DE | 10 2009 050 847 | 4/2011 |
| DE | 20 2009 018 583 | 4/2012 |
| DE | 10 2012 009 668 | 8/2013 |
| DE | 10 2015 001 435 | 8/2015 |
| EP | 1 634 734 | 3/2006 |
| EP | 1 915 537 | 3/2016 |

* cited by examiner

ACCUMULATOR DEVICE AND HYDROPNEUMATIC SUSPENSION

FIELD OF THE INVENTION

The invention relates to an accumulator device and a hydropneumatic suspension having such an accumulator device.

BACKGROUND OF THE INVENTION

Such accumulator devices are known in the prior art, for example from DE 10 2012 009 668 B3. These accumulator devices have two accumulator elements arranged in an accumulator housing in the form of a dual piston accumulator. The pistons are coupled to each other by a piston rod. The accumulator elements differ with respect to the prevailing pressure level. One accumulator element is described as low pressure storage. The other accumulator element is as described a high pressure storage. In such an accumulator element, a hydraulic fluid can be stored at a high pressure and retrieved.

In practice, a need exists to adapt the characteristic accumulator curve of the accumulator devices as optimally as possible to a respective application. For example, industrial trucks are driven in different load states. The load is relatively low for empty runs, while it is significantly increased after picking up a load. In both load ranges, a suspension system with an accumulator device should enable a suspension that ensures a safe operation of the industrial truck without damaging the payload during the trip and with adequate comfort for the driver.

SUMMARY OF THE INVENTION

Therefore, the invention addresses the problems of providing an improved accumulator device and a hydropneumatic suspension having such an accumulator device having a characteristic accumulator curve that is optimally adapted to at least two load ranges.

This problem is solved by an accumulator device having at least two accumulator elements combined into a unit and having separate characteristic accumulator curves independent from each other, in particular on the basis of pre-charge pressures. The respective characteristic accumulator curves combined result in an overall characteristic accumulator curve, according to which a fluid can be stored in the unit and retrieved therefrom. Both gases and liquids can be stored in the accumulator device as fluids.

The accumulator device according to the invention can used to advantageously adapt the characteristic accumulator curve to different load ranges. Each of the accumulator elements can be optimally adapted to a load range. The accumulator elements act independently from each other and are not rigidly mechanically coupled. By combining the accumulator elements in the common housing, the accumulator elements complement each other, resulting in an overall characteristic accumulator curve, according to which the fluid can be stored in the unit and retrieved. In that way a highly efficient and long lasting accumulator device is provided with a compact and cost-effective design, which is optimized for at least two load ranges.

In one especially advantageous embodiment, each of the accumulator elements forms an accumulator, in particular a hydraulic accumulator. The separator element has in each case two media chambers separated from each other.

The accumulator elements are accommodated in a common accumulator housing forming the unit. In that way the accumulator elements can be arranged in parallel connection or in series connection in the same accumulator housing. This arrangement is possible because a separator element can also be arranged advantageously such that it separates more than two media chambers from each other. In that way it is possible to develop complex, yet also simple characteristic accumulator curves of the accumulator device depending on requirements. The characteristic curves can also have more than two load ranges and different courses, for example flatter or steeper, in the respective load ranges.

The respective separator element can be a dividing piston of an accumulator element configured as a piston accumulator. Piston accumulators can be produced particularly cost-effectively and are characterized by a long service life. In addition, the characteristic accumulator curves of piston accumulators have an especially continuous, easy to calculate, exponential course without discontinuities.

Advantageously one of the dividing pistons is guided in a longitudinally movable manner on the inside of the accumulator housing. The next dividing piston in the series is guided in a longitudinally movable manner on the piston wall of the preceding dividing piston. This arrangement provides for an especially installation space saving design of the accumulator device. In addition, low-cost turned parts can be installed. The design in the form of dividing pistons arranged within each other provides for accumulation of even the highest pressures, for example up to 450 bar, in the accumulator device.

A first of the media chambers holding a compressible medium can be formed between two adjacent dividing pistons. One of the dividing pistons can limit another of the media chambers with an incompressible medium within the accumulator housing. The other dividing piston can limit a third media chamber with a further compressible medium. In that way three media chambers can be formed within the accumulator housing by two dividing pistons. Of these, two can be filled with compressible media, in particular a working gas, like nitrogen ($N_2$).

The dividing piston guided on the inside (or inside wall) of the accumulator housing is advantageously configured as a hollow cylinder, whose free internal chamber is penetrated by a partition wall. The partition wall can be arranged on the end of the hollow cylinder or in a central region of the same. It can be fixed there in a detachable manner, for example, with at least one snap ring, in particular a Seeger® ring, or undetachably, for example by welding, adhesive bonding or soldering.

The further dividing piston guided within the one dividing piston can have a limit stop formed by the partition wall of the one dividing piston. Here any fastening of the partition wall is considered as part of the same. In that way, the further dividing piston can be placed against the one dividing piston, i.e. a transition of the overall characteristic accumulator curve results. The accumulator element, which is fully compressed, is inoperative if the pressure exceeds the maximum pressure.

The dividing piston with its one partition wall can have a larger cross-sectional area to which pressure can be applied than the next dividing piston in the series. The pressurized cross-sectional area is, in addition to the pre-charge pressure, critical for the characteristics of the characteristic accumulator curve. For a greater cross-sectional area, a lower pre-charge pressure must be provided in the respective media chamber with the compressible medium. Larger cross-sectional areas additionally enable the operation of the accumulator device at higher operating pressures.

Preferably each of the chambers holding a compressible medium has its own characteristic accumulator curve, in particular depending on its volume and on its pre-charge pressure. The pre-charge pressure can then be adapted to the respective requirements. Different pre-charge pressures can be introduced in the media chambers. However, they can also have the same pre-charge pressures. In addition, the pre-charge pressures can be dynamically adapted, for example, by the optional connection of further accumulators or through targeted tempering.

The accumulator device according to the invention can in particular in industrial trucks be installed as part of a suspension. Accordingly, the invention also comprises a hydropneumatic suspension having at least one suspension cylinder, to which different loads can be applied. A working chamber of the suspension cylinder is connected in a media-conductive manner to a media chamber for an incompressible medium of the accumulator device.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
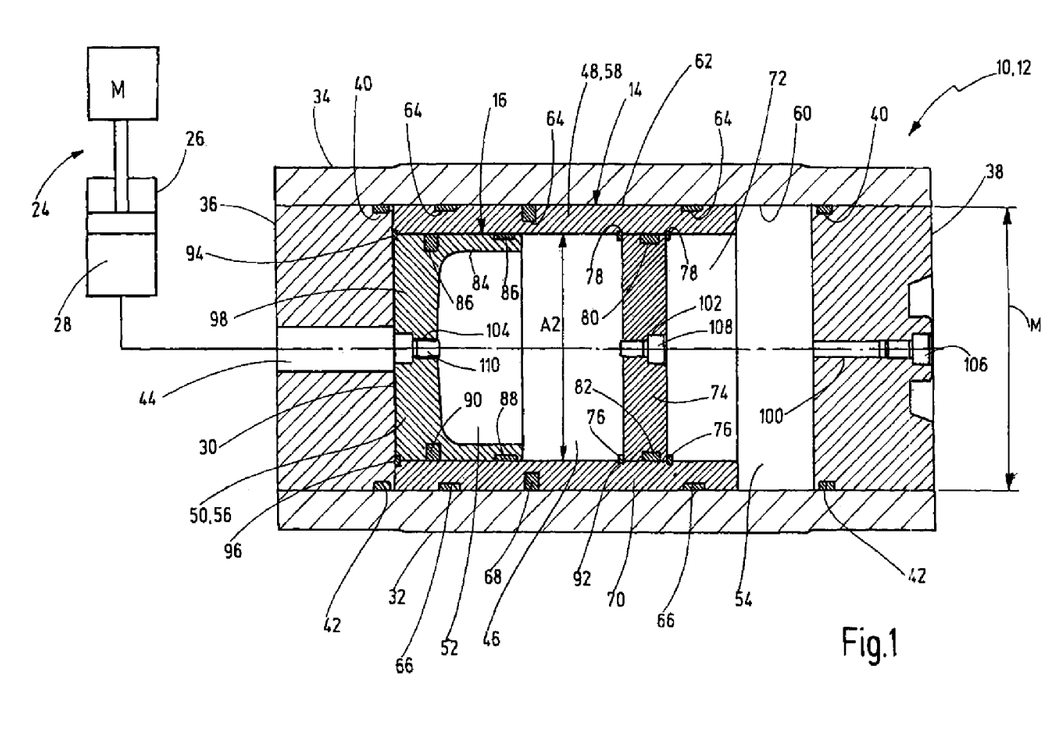
FIG. 1 is a side view in section view of a hydropneumatic suspension system according to an exemplary embodiment of the invention.
Figure 2:
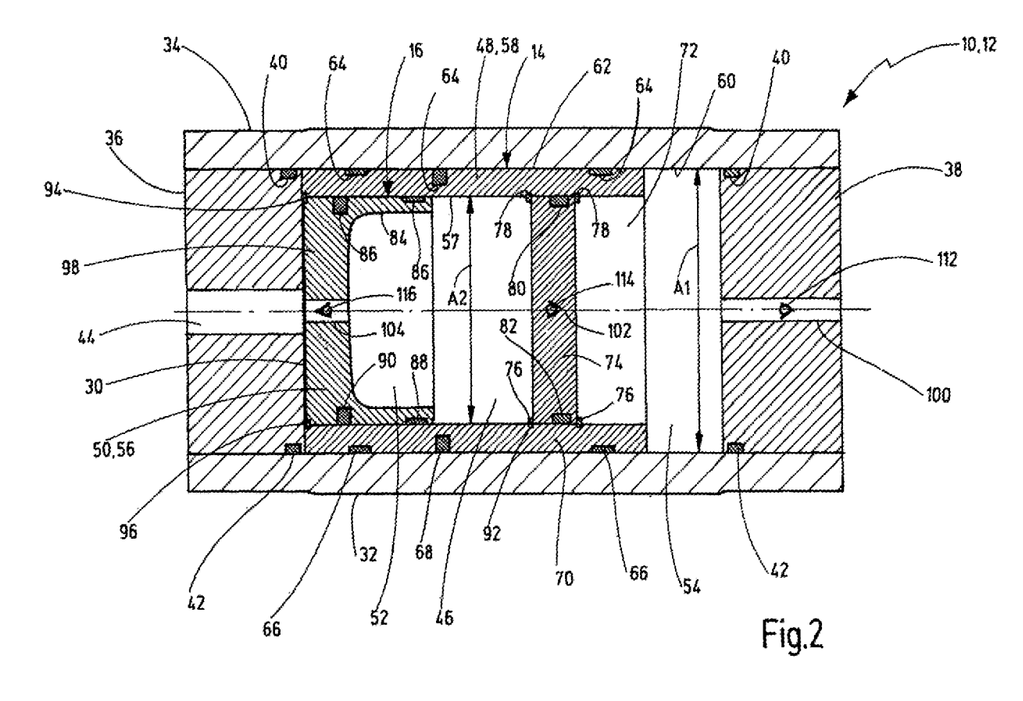
FIG. 2 is a schematic side view in section of an accumulator device according to the exemplary of the invention.

FIGS. 1 and 2 each show a longitudinal section through an accumulator device or accumulator according to the invention 10 including first and second accumulator elements 14, 16 combined into one unit 12, each having a separate characteristic accumulator curve 18, 20 independent from each other, in particular on the basis of different pre-charge pressures. The respective characteristic accumulator curves 18, 20 combined result in an overall characteristic accumulator curve 22 (cf. FIGS. 3 to 7), according to which a fluid can be stored in the unit 12 and retrieved therefrom.

FIG. 1 shows in addition a hydropneumatic suspension 24, for example, for an industrial truck with at least one suspension cylinder 26, which can have different loads M applied to it. A working chamber 28 of the suspension cylinder 26 is connected in a media-conductive manner to or in fluid communication with a media chamber 30 for an incompressible medium, such as hydraulic oil of the accumulator device 10.

The accumulator device 10 has an accumulator housing 32, which has a tubular hollow cylindrical part 34. Into the ends of cylinder part 34, disk-shaped end pieces 36, 38 are inserted. For sealing purposes the end pieces 36, 38 have peripheral grooves 40, into which sealing rings 42 are inserted. In the left end piece 36 in the image plane, a port 44 is provided for the introduction of the fluid to be stored in the accumulator device 10. The accumulator housing 32 encloses an internal space 46, in which the accumulator elements 14, 16 are arranged. The accumulator elements 14, 16 are formed in the shape of hydraulic accumulators, each having a separator element 48, 50, separating a total of three media chambers 30, 52, 54 from one another. The separator elements 48, 50 are configured as first and second dividing pistons 56, 58, such that the accumulator elements 14, 16 are configured as piston accumulators.

The second dividing piston 58 is guided in a longitudinally movable manner on an inside 60 of the accumulator housing 34. To this end, three grooves 64 are provided on its peripheral side 62. Guide rings 66 are inserted in the outer grooves 64 viewed in the axial direction, and a sealing ring 68 is inserted in the middle groove 64. The dividing piston 58 guided on the inside 60 of the accumulator housing 34 is configured as a hollow cylinder 70 whose free internal chamber 72 is penetrated by a partition wall 74. The one dividing piston 58 is therefore H shaped in the longitudinal section shown. The partition wall 74 is in a detachable manner fixed in the hollow cylinder 70 by two snap rings 76, for example in the form of Seeger® rings. The snap rings 76 are inserted in inner peripheral grooves 78 of the hollow cylinder 70. The partition wall 74 has a peripheral groove 80 for sealing the one dividing piston 58. The peripheral groove 80 receives a sealing ring 82.

The next further dividing piston 56 viewed in an imaginary series is guided in a longitudinally movable manner at the inner piston wall 57 (FIG. 2) of the preceding of first dividing piston 58 in the series of pistons. The further dividing piston 56 is configured cup-shaped. The wall 84 of the further dividing piston 56 partially limits the inner media chamber 52. The dividing piston 56 has two peripheral grooves 86. A guide ring 88 is arranged in the one groove 86, and a sealing ring 90 is arranged in the other groove 86.

The further dividing piston 56 guided within the one dividing piston 58 has a limit stop 92 formed by the partition wall 74 of the one dividing piston 58. Here any fixing means or fixing 76 of the partition wall 74 is considered as part of it. This limit stop 92 forms the right end position of the further dividing piston 56 in the one dividing piston 58 in the image plane. On the end side a further snap ring 94 is provided in the hollow cylinder 70 of the one dividing piston 58. Snap ring 94 forms a second limit stop 96 for the further dividing piston 56 and prevents the further dividing piston 56 from being able to move out of the one dividing piston 58. Although not shown in greater detail, it would be conceivable to have in the imaginary series of dividing pistons a dividing piston downstream of the dividing piston 56 forming further media chambers guided in the dividing piston 56, to obtain in such a way a fine gradation for the characteristic of the pre-charge pressure. The imaginary series of pistons can then be extended as required on principle.

First media chamber 52 between the two adjacent dividing pistons 56, 58 is filled with a compressible medium. The dividing pistons 56, 58 limit in addition the second media chamber 30 with the incompressible fluid. The other dividing piston 58 finally limits the third media chamber 54 within the accumulator housing 32, which is in turn filled with a compressible medium. The compressible media are in particular gaseous media, preferably in the form of nitrogen ($N_2$). The incompressible medium is a fluid, such as a hydraulic fluid, for example oil. For the appropriate adjustment of the pre-load characteristic the media chambers 52 and 54 can also be filled with compressible media differing from each other, so that different degrees of spring stiffness result for the respective differing gas columns in the respective piston accumulator chambers.

In the end piece 38, opposite the end piece 36 having the port 44, and in the partition wall 74 of the one dividing piston 58 and/or in a base 98 of the further dividing piston 56 channels are provided 100, 102, 104, in particular in the form of boreholes, in which filler valves 106, 108, 110 (FIG. 1) are arranged. These filler valves are in the form of check valves 112, 114, 116 (cf. FIG. 2) and can be inserted in the filling points 106, 108, 110. The filling points 106, 108, 110 can be hermetically sealed by locking screws (cf. FIG. 1) and seals not shown in greater detail.

The one dividing piston 58 with its one partition wall 74 therein has a greater cross-sectional area A1 to which one of the media can be applied, than the next dividing piston in the series 58 having the cross-sectional area A2.

Each of the media chambers 52, 54, filled with a compressible medium—regardless of the respective other media chamber 54, 52, has its own characteristic accumulator curve, in particular depending on its volume and its settable pre-charge pressure.

The accumulator device according to the invention can be used for the hydropneumatic suspension 24, whose required function on principle can be divided into two load ranges. The two accumulator elements 14, 16 can be used for this purpose, each having media chambers 52, 54 of variable volume holding a compressible medium. The first media chamber 52 formed between the dividing piston 56, 58 preferably works in a lower load range, i.e. at a relatively low pre-charge pressure, while the third media chamber 54 as a rule works in a higher load range and therefore has by way of contrast a higher pre-charge pressure. If the maximum operating pressure is achieved in the first media chamber 52, the further dividing piston 56 comes to rest on the limit stop 92 on the partition wall 74 of the one dividing piston 58. If fluid is further stored in the accumulator device 10 at an even higher pressure, the one dividing piston 58 in the image plane of FIGS. 1 and 2 moves to the right and, in doing so, reduces the volume of the third media chamber 54. The accumulator device 10 has been filled with fluid (oil) to maximum capacity via the second media chamber 30 when the one dividing piston 58 also comes to rest on the right end piece 38 in the image plane, resulting in a maximum pre-charge pressure on the gas side of the accumulator elements 14, 16.

By setting the pre-charge pressures in the media chambers 52, 54, individual characteristic accumulator curves of the accumulator elements 14, 16 can be generated, by means of which the accumulator device 10 can be operated in different load ranges with a separate characteristic accumulator curve in each case. The transition between the pre-charge pressures of the storage areas can thereby be preferably continuous in design, however as and when required also discontinuous, in particular with a kink or a bend. If the third media chamber 54 has a lower pre-charge pressure than the first media chamber 52 between the dividing pistons 56, 58, a greater travel and hence a flatter characteristic can be implemented.

The courses of the characteristic accumulator curves 18, 20 of the individual accumulator elements 14, 16 and of the overall characteristic accumulator curve 22 are shown by way of example in the form of graphs in FIGS. 3 to 7. In each case, the volume of the fluid stored in the accumulator device 10 in the media chamber 30 is shown on the abscissa in liters, here of a fluid in the form of hydraulic oil. Approximately 1.1 liters of fluid can be stored in the chamber 30 with the shown accumulator element 10. On the ordinate, the storage pressure is given in bar. The discussed pressure curves are reproduced up to a maximum of 300 bar. It should be understood that the volume and pressure specifications refer solely to a special exemplary embodiment of an accumulator element 10 according to the invention and are only intended to explain the principle underlying the invention. The volume and the pressure specifications can be adapted to the respective application of the accumulator device, which does not have to be restricted to the application for the hydro-pneumatic suspension system.

Figure 3:
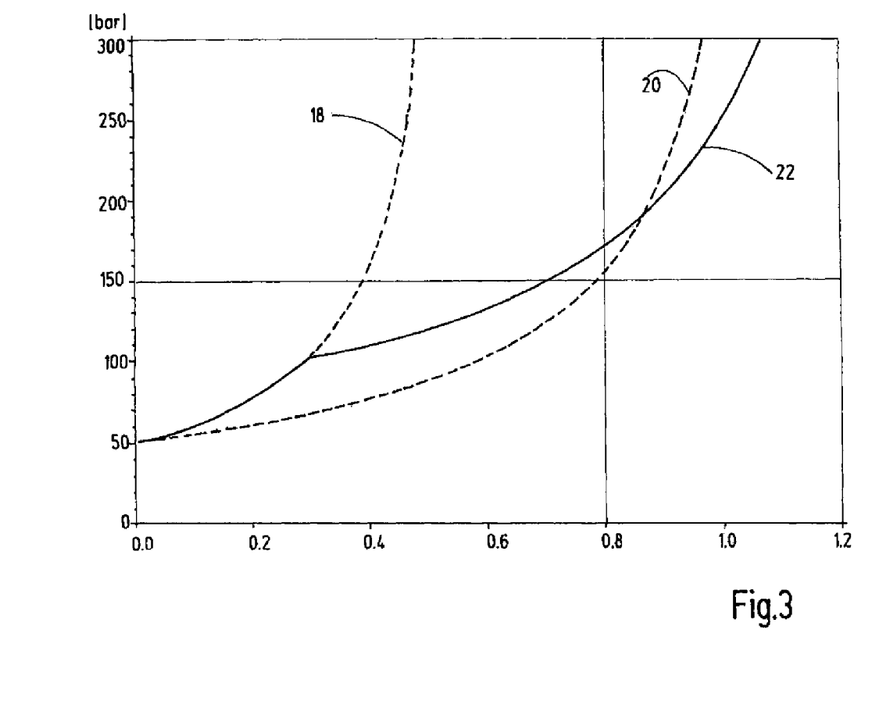
FIGS. 3 to 7 are graphs of the characteristic accumulator curves of two accumulator elements and a resulting overall characteristic accumulator curve for different pre-charge pressures.

In FIG. 3 the pre-charge pressures in the media chambers 52, 54 for the compressible medium are initially identical at 50 bar. Starting from there, with increased filling of the media chamber 30 via the fluid-side use of the suspension cylinder 26 triggered by the load M to be moved, the characteristic accumulator curve 18 of the first accumulator element 16 of the first media chamber 52 and the characteristic accumulator curve 20 of the second accumulator element 14 of the third media chamber 54 have an exponential course. In that way an overall characteristic accumulator curve 22 results, which up to a pressure of 100 bar follows the course of the characteristic accumulator curve 18 of the first accumulator element 16. This course results from the fact that only the further dividing piston 56 is moved by the incoming fluid and compresses the medium in the first media chamber 52. If the pressure of the incoming fluid exceeds 100 bar, the further dividing piston 56 comes into contact with the partition wall 74. Starting from this pressure, the second accumulator element 14 is then compressed. The course of the overall characteristic accumulator curve 22 above 100 bar therefore corresponds to the course of the characteristic of the second accumulator element 14, but is offset by a volume of 0.3 liters and by a pressure of 50 bar.

Figure 4:
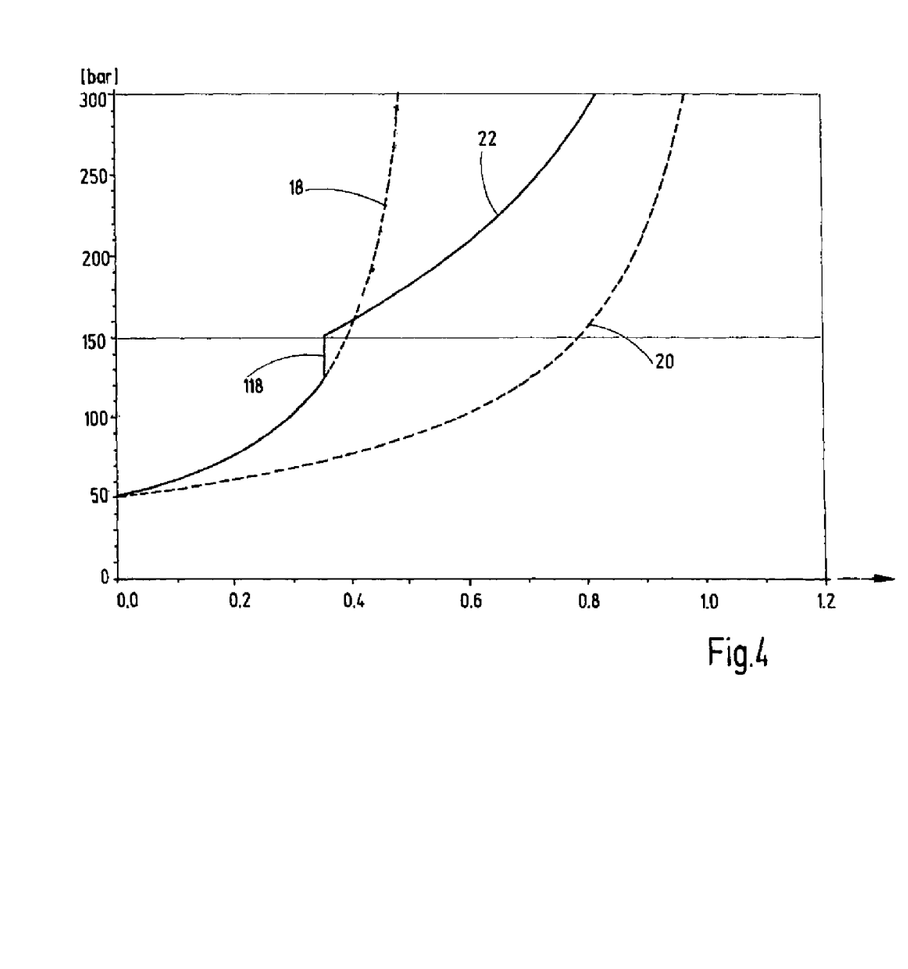

In FIG. 4 initially the same initial situation is presented as in FIG. 3: Both accumulator elements 14, 16 have a pre-charge pressure of 50 bar and the characteristic accumulator curves 18, 20 of the individual accumulator elements 14, 16 have the known exponential course. At the beginning the overall characteristic accumulator curve 22 likewise follows the course of the characteristic accumulator curve 18 of the second accumulator element 16 up to a stored volume of approximately 0.35 liters and a pressure of approximately 125 bar. At this point a bend 118 in the graph occurs, in which the stored volume does not change, but the pressure increases up to 150 bar. Above this pressure the course of the overall characteristic accumulator curve 22 follows the course of the characteristic accumulator curve 20 of the first accumulator element 14, but is offset by a volume of 0.35 liters and a pressure of 100 bar.

Figure 5:
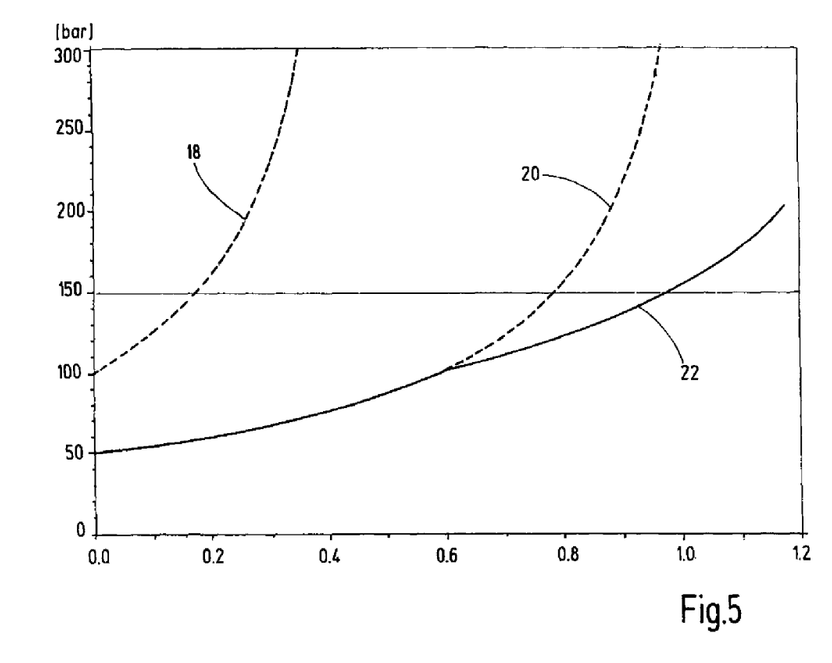

The diagram of FIG. 5 is identical to FIGS. 3 and 4 with respect to the characteristic accumulator curve 20 of the first accumulator element 14. The difference between the figures is in the fact that the pre-charge pressure of the first accumulator element 16 is increased by 50 bar to 100 bar. The characteristic accumulator curve 18 of the second accumulator element 16 has an exponential course, but which is steeper in comparison to FIGS. 3 and 4. Because the pre-charge pressure of the first accumulator element 14 is lower than the pre-charge pressure of the second accumulator element 16, the first accumulator element 14 is compressed first, i.e. the one dividing piston 58 is moved and the volume of the third media chamber 54 decreases. The position of the second dividing piston 56 relative to the first dividing piston 58 does not change at first. For that reason the course of the overall characteristic accumulator curve 22 at first follows the course of the characteristic accumulator curve 20 of the first accumulator element 14, until the pressure of the stored fluid exceeds the pre-charge pressure of 100 bar of the second accumulator element 16. Starting from this pressure the second accumulator element 16 is also compressed, i.e. the second dividing piston 56 moves relative to the first dividing piston 58 and compresses the first media chamber 52. In that way, starting from a pressure of 100 bar a flatter exponential course of the overall characteristic accumulator curve 22 results.

Figure 6:
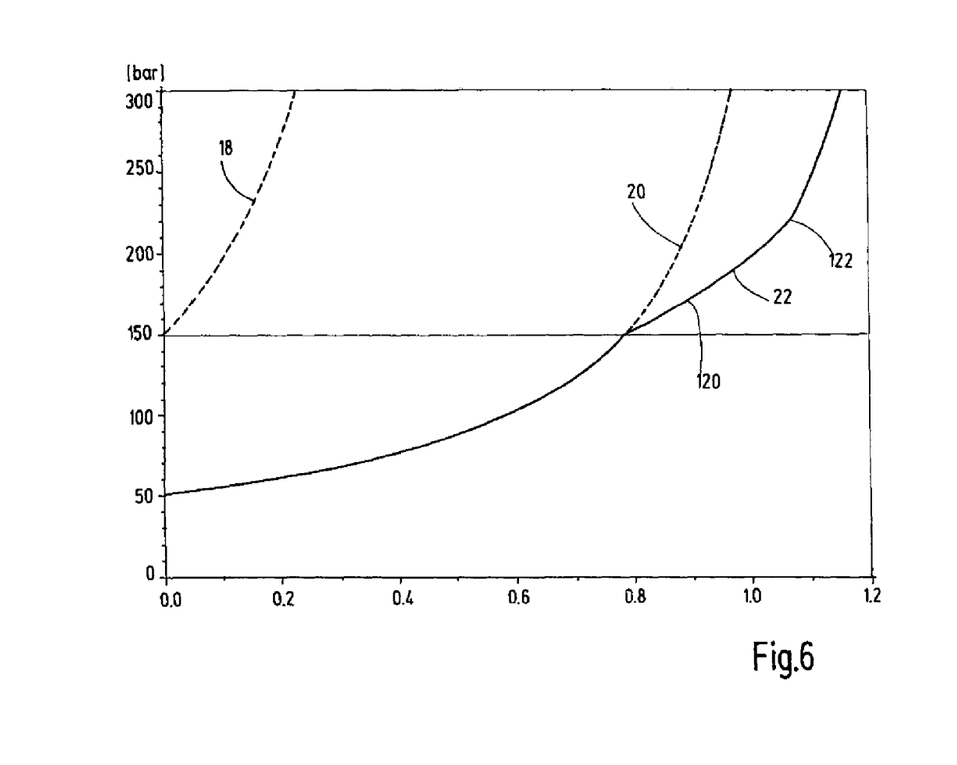

The diagram of FIG. 6 differs from that of FIG. 5 in that the pre-charge pressure of the second accumulator element 16 is increased again by 50 bar to a total of 150 bar. For that reason the course of the characteristic accumulator curve 18 of the second accumulator element 16 is steeper than in FIG. 5. The pre-charge pressure of the first accumulator element 14 is unchanged. For that reason the course of the overall characteristic accumulator curve 22 follows the course of the characteristic accumulator curve 20 of the first accumulator element 14, until the pressure of the stored medium exceeds the pre-charge pressure of the second accumulator element 16. Starting from this pressure the second accumulator element 16 and the first accumulator element 14 are jointly compressed, resulting in a flatter exponential course of the overall characteristic accumulator curve 22 in comparison to the characteristic accumulator curve 20 of the first accumulator element 14. This second section 120 of the overall characteristic accumulator curve 22 ends at a pressure of approximately 220 bar, because the second dividing piston 56 strikes the first dividing piston 58, and the first media chamber 52 is fully compressed. Starting from this pressure only the first accumulator element 14 can be further compressed. This means that the course of the overall characteristic accumulator curve 22 has a discontinuity in the form of a kink 122, and starting from this pressure of about 220 bar again follows an exponential course like that of the characteristic accumulator curve 20 of the first accumulator element 14.

Figure 7:
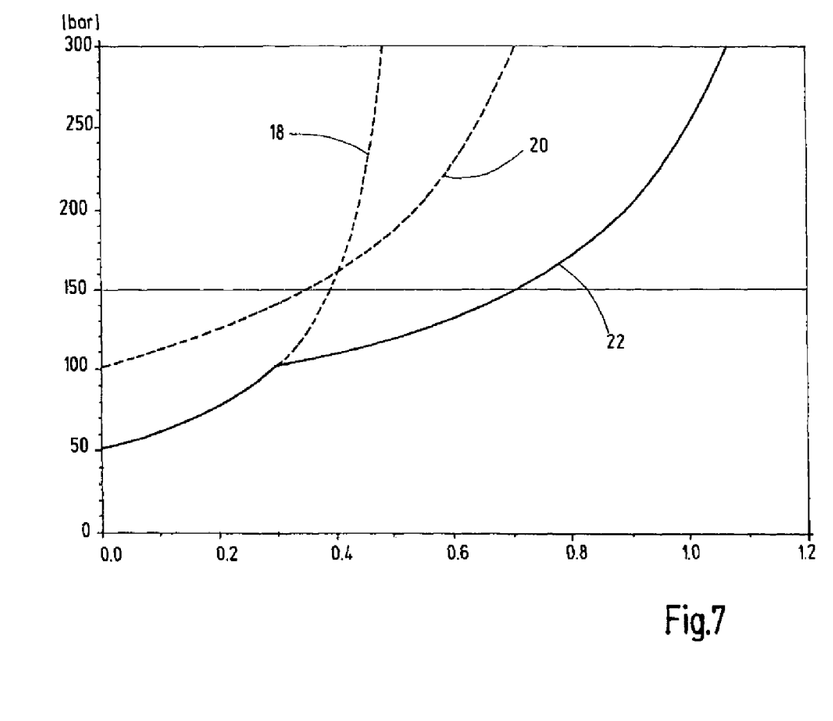

The diagram of FIG. 7 differs from that of FIG. 3 in that the pre-charge pressure of the first accumulator element 14 is increased by an amount of 50 bar to a total of 100 bar. Otherwise the characteristic accumulator curves 18, 20 have an exponential course again. This difference has the effect that the overall characteristic accumulator curve 22 initially follows the course of the characteristic accumulator curve 18 of the first storage facility 16, until the pressure of the stored fluid exceeds the pre-charge pressure of the first accumulator element 14. Starting from this pressure, in addition to the second accumulator element 16, the first accumulator element 14 is also compressed, so that the overall characteristic accumulator curve 22 has a flatter exponential course upon reaching the pre-charge pressure of the first accumulator element 14.

The accumulator device according to the invention 10 can hence be used to advantageously adapt the characteristic accumulator curve to different load ranges. Every single one of the accumulator elements 10 can be optimally adapted to a load range. By combining the accumulator elements 10 in the common housing 32, the accumulator elements 14, 16 complement each other, so that an overall characteristic accumulator curve 22 results, according to which a fluid can be stored in the unit 12 and retrieved therefrom. In that way a highly efficient and long lasting accumulator device 10 is provided having a compact and cost-effective design, which is optimized for at least two load ranges for a corresponding connected hydraulic consumer.

While various embodiment have been chosen to illustrate the invention, it will be understood by those skilled in the art that various changes and modifications can be made therein without departing from the scope of the invention as defined in the claims.

The invention claimed is:

1. An accumulator device, comprising:
a common accumulator housing having first and second end pieces at opposite ends thereof;
a first dividing piston being guided for longitudinal movement inside said common accumulator housing and separating first and third media chambers in said common accumulator housing forming a first piston accumulator, said first dividing piston having a piston wall and a partition wall with a limit stop;
a second dividing piston being guided for longitudinal movement within and on said piston wall in series with said first dividing piston and separating first media chamber and a second media chamber in said common accumulator housing forming a second piston accumulator, said first dividing piston with said partition wall having a greater first pressurizable cross-sectional area then a second pressurizable cross-sectional area of said second dividing piston, said first media chamber being between said first and second dividing pistons, said second media chamber being between said first dividing piston and said first end piece, said third media chamber being between said second dividing piston and said second end piece;
a first compressible medium in said first media chamber between said first and second dividing pistons; and
a non-compressible medium in said third media chamber conveyable into and out of said third media chamber via a port in said second end piece;
whereby said first and second accumulators are formed as a unit and have separate characteristic accumulator curves independent from each other by pre-charge pressures in said first and second media chambers, resulting in an overall characteristic accumulator curve.

2. An accumulator device according to claim 1 wherein a second compressible medium is in said second media chamber between said first dividing piston and said first end piece.

3. An accumulator device according to claim 1 wherein said first dividing piston is a hollow cylinder with an internal chamber penetrated by said partition wall.

4. An accumulator device according to claim 2 wherein each of said first and second compressible mediums have different characteristic accumulator curves dependent on volumes and precharge pressures thereof.

5. A hydropneumatic suspension, comprising:
a suspension cylinder subjectable to different loads applied thereon; and
an accumulator device being in fluid communication with said suspension cylinder and conveying an incompressible medium to said suspension cylinder, said accumulator device including
a common accumulator housing having first and second end pieces at opposite ends thereof,
a first dividing piston being guided for longitudinal movement inside said common accumulator housing and separating first and third media chambers in said common accumulator housing forming a first piston accumulator, said first dividing piston having a piston wall and a partition wall with a limit stop,
a second dividing piston being guided for longitudinal movement within and on said piston wall in series with said first dividing piston and separating first media chamber and a second media chamber in said common accumulator housing forming a second piston accumulator, said first dividing piston with said partition wall having a greater first pressurizable cross-sectional area then a second pressurizable cross-sectional area of said second dividing piston, said first media chamber being between said first and second dividing pistons, said second media chamber being between said first dividing piston and said first end piece, said third media chamber being between said second dividing piston and said second end piece, a first compressible medium in said first media chamber between said first and second dividing pistons, and a non-compressible medium in said third media chamber conveyable into and out of said third media chamber via a port in said second end piece;

whereby said first and second accumulators are formed as a unit and have separate characteristic accumulator curves independent from each other by pre-charge pressures in said first and second media chambers, resulting in an overall characteristic accumulator curve.

6. A hydropneumatic suspension according to claim 5 wherein a second compressible medium is in said second media chamber between said first dividing piston and said first end piece.

7. A hydropneumatic suspension according to claim 5 wherein said first dividing piston is a hollow cylinder with an internal chamber penetrated by said partition wall.

8. A hydropneumatic suspension according to claim 5 wherein each of said first and second compressible mediums have different characteristic accumulator curves dependent on volumes and precharge pressures thereof.

* * * * *